US012805505B2

(12) United States Patent
Mateer et al.

(10) Patent No.: US 12,805,505 B2
(45) Date of Patent: Nov. 24, 2026

(54) BAIT PACKET AND BAIT PACKET ASSEMBLY

(71) Applicant: Woodstream Corporation, Lancaster, PA (US)

(72) Inventors: Chad Mateer, Manheim, PA (US); Luke Haney, Lititz, PA (US)

(73) Assignee: Woodstream Corporation, Lancaster, PA (US)

( * ) Notice: Subject to any disclaimer, the term of this patent is extended or adjusted under 35 U.S.C. 154(b) by 0 days.

(21) Appl. No.: 18/904,171

(22) Filed: Oct. 2, 2024

(65) Prior Publication Data

US 2026/0000064 A1 Jan. 1, 2026

Related U.S. Application Data

(60) Provisional application No. 63/665,222, filed on Jun. 27, 2024.

(51) Int. Cl.
*A01M 1/20* (2006.01)

(52) U.S. Cl.
CPC ..... *A01M 1/2011* (2013.01); *A01M 2200/011* (2013.01)

(58) Field of Classification Search
CPC .............. A01M 1/2005; A01M 1/2011; A01M 2200/011
See application file for complete search history.

(56) References Cited

U.S. PATENT DOCUMENTS

| | | | | |
|---|---|---|---|---|
| 6,618,983 | B1 * | 9/2003 | Spragins | A01M 1/2016 43/132.1 |
| 9,161,525 | B2 * | 10/2015 | King | A01M 1/2011 |
| 10,485,227 | B2 | 11/2019 | Lubic | |
| 11,445,717 | B2 | 9/2022 | Lubic | |
| 2010/0205850 | A1 * | 8/2010 | Bernard | A01M 1/2011 43/132.1 |
| 2017/0196214 | A1 * | 7/2017 | Lubic | A01M 1/2011 |

FOREIGN PATENT DOCUMENTS

KR 20080001464 U * 6/2008 .......... A01M 1/2011

* cited by examiner

*Primary Examiner* — Richard G Davis
(74) *Attorney, Agent, or Firm* — Barley Snyder

(57) ABSTRACT

A bait packet includes a container defining a bait containing space with a bait in the bait containing space and an access structure protruding from the container into the bait containing space. The access structure has a first portion that is above a level of the bait in a first orientation of the bait packet and a second portion different from the first portion that is above the level of the bait in a second orientation of the bait packet. The second orientation is approximately perpendicular to the first orientation.

20 Claims, 22 Drawing Sheets

BAIT PACKET AND BAIT PACKET ASSEMBLY

CROSS-REFERENCE TO RELATED APPLICATIONS

This application claims priority under 35 U.S.C. § 119 to U.S. Provisional Patent Application No. 63/665,222, filed Jun. 27, 2024.

FIELD OF THE INVENTION

The present invention relates to a device for the treatment of pests and, more particularly, to a bait packet and bait packet assembly.

BACKGROUND

Bait packets for the treatment of household pests, such as ants, are often formed from a container that contains a liquid or gel-like bait material. The container is designed with a removable tab and is placeable on a surface; the ants enter the container to access the bait material and return with the bait material to their colony, where the poisonous bait material is efficiently distributed throughout the colony to treat the source of the pests.

Most commonly available bait packets, however, are designed to be positioned only in one orientation, typically a horizontal orientation. Positioning the bait packet in other orientations, such as a vertical orientation attached to a wall, would results in spilling of the bait material and/or would impair the ability of a large number of ants to reach the bait material in the container. Commonly available bait packets are thus limited in usage by being restricted to one pre-defined orientation.

SUMMARY

A bait packet includes a container defining a bait containing space with a bait in the bait containing space and an access structure protruding from the container into the bait containing space. The access structure has a first portion that is above a level of the bait in a first orientation of the bait packet and a second portion different from the first portion that is above the level of the bait in a second orientation of the bait packet. The second orientation is approximately perpendicular to the first orientation.

BRIEF DESCRIPTION OF THE DRAWINGS

The invention will now be described by way of example with reference to the accompanying Figures, of which.

DESCRIPTION OF THE EMBODIMENTS

Figure 1:
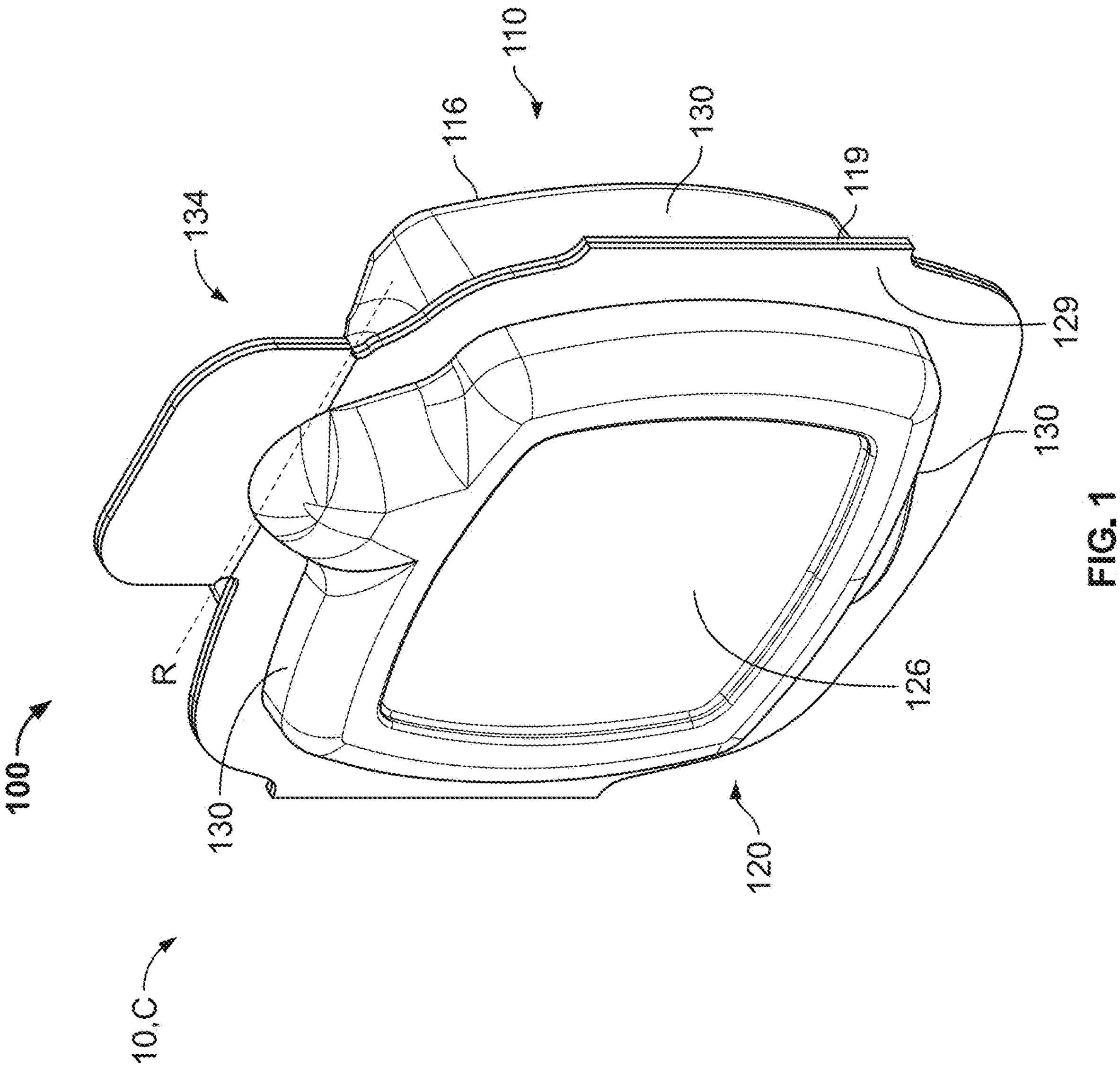
FIG. 1 is a perspective view of a bait packet according to an embodiment.
Figure 2:
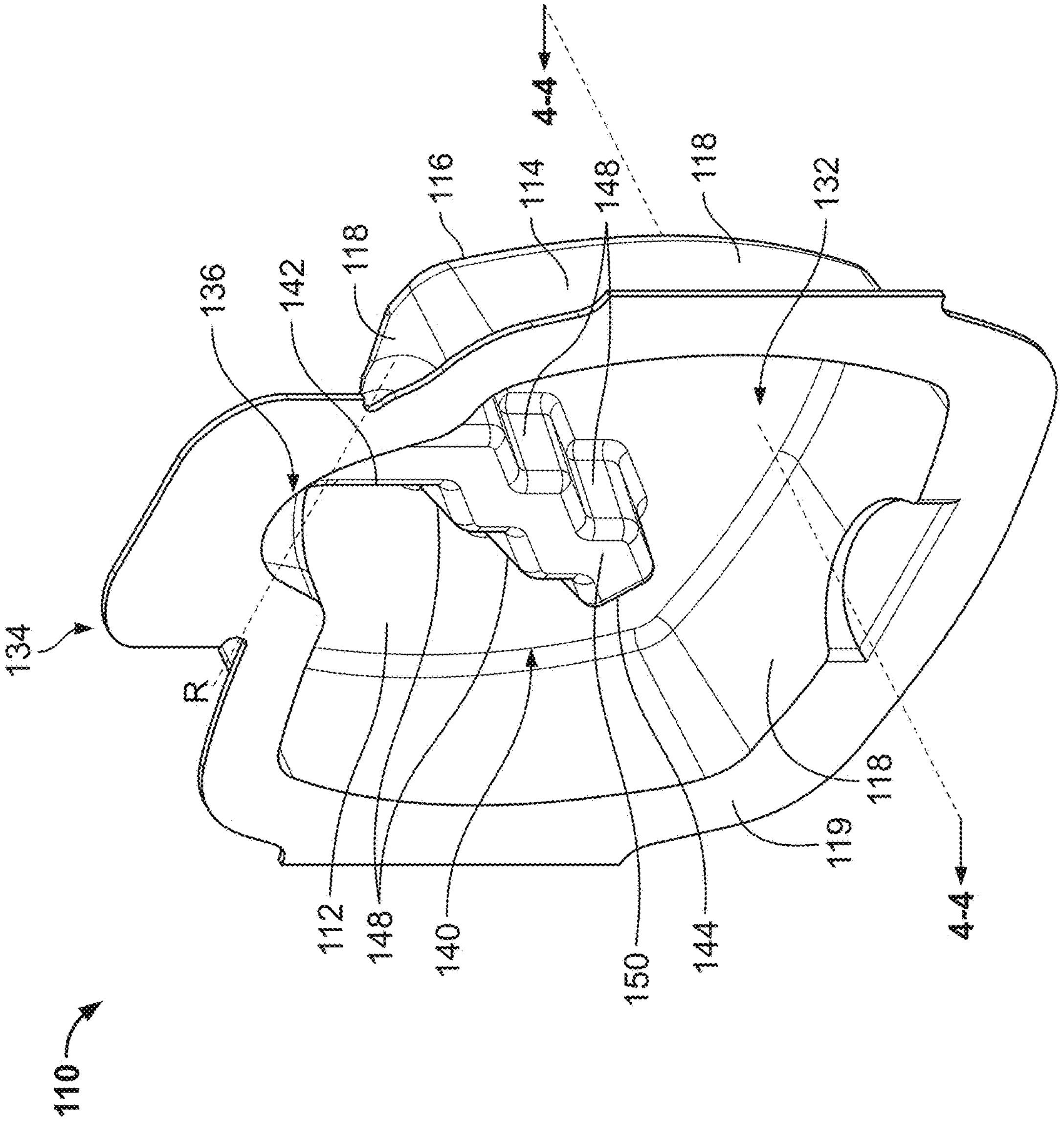
FIG. 2 is a perspective front view of a base of the bait packet.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure. Any directional descriptors used in the specification are merely for clarity of the description and for differentiation of the various directions. These directional descriptors do not imply or require any particular orientation of the disclosed elements.

A bait packet 10 according to an embodiment is shown in FIGS. 1-11. The bait packet 10 forms a container 100 that contains a bait 190, such as a liquid or gel-like, sugar-based bait, and allows access to the bait 190 in multiple orientations without spilling. The container 100 has a base 110 and a cover 120.

The base 110, as shown in FIGS. 2-5, has an inner side 112 and an outer side 114 opposite the inner side 112. The base 110 has a base wall 116 and a plurality of base sides 118 extending from the base wall 116. At an end of each of the base sides 118 opposite the base wall 116, in the shown embodiment, the base 110 has a base flange 119.

Figure 6:
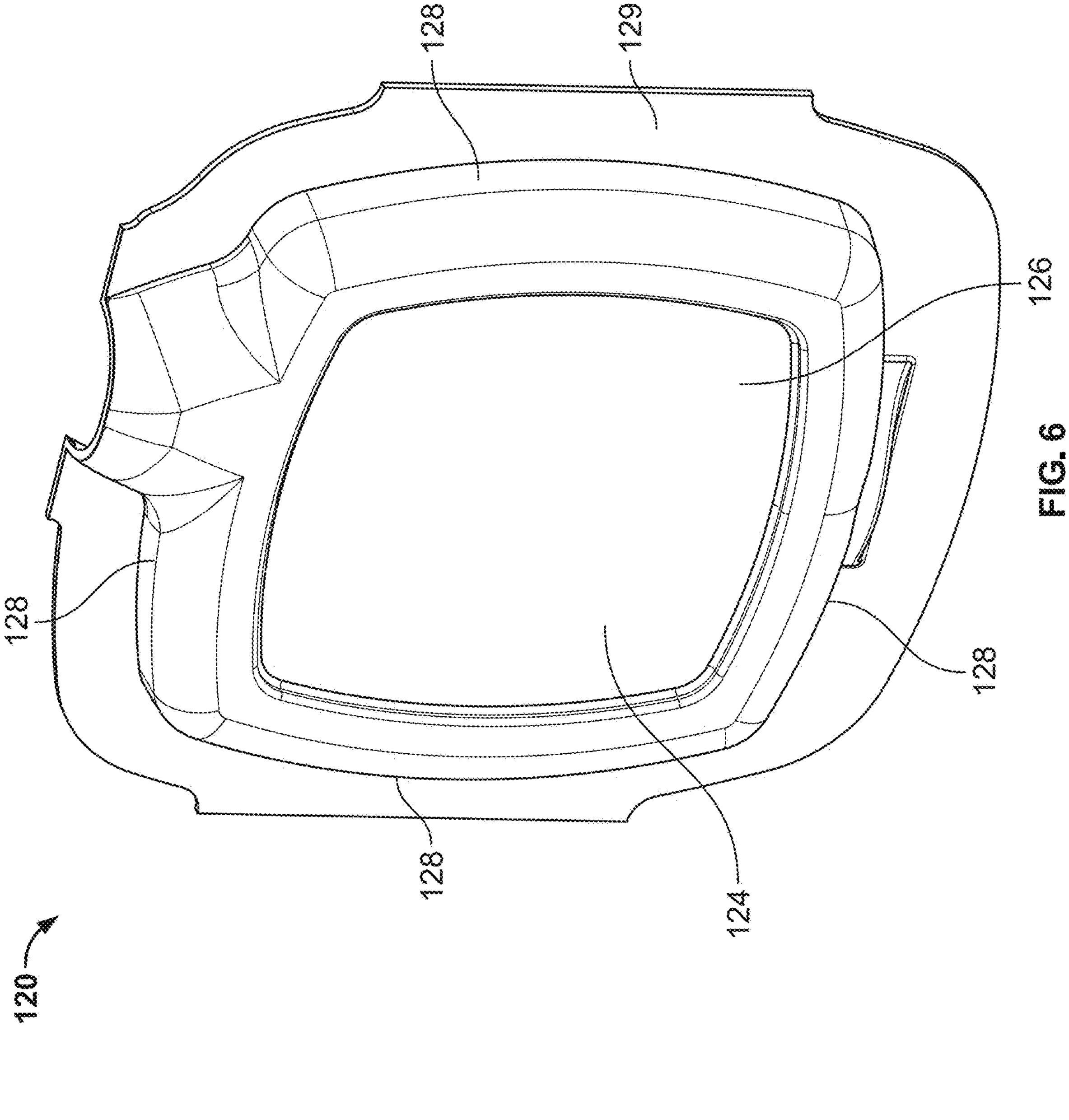
FIG. 6 is a perspective front view of a cover of the bait packet.
Figure 7:
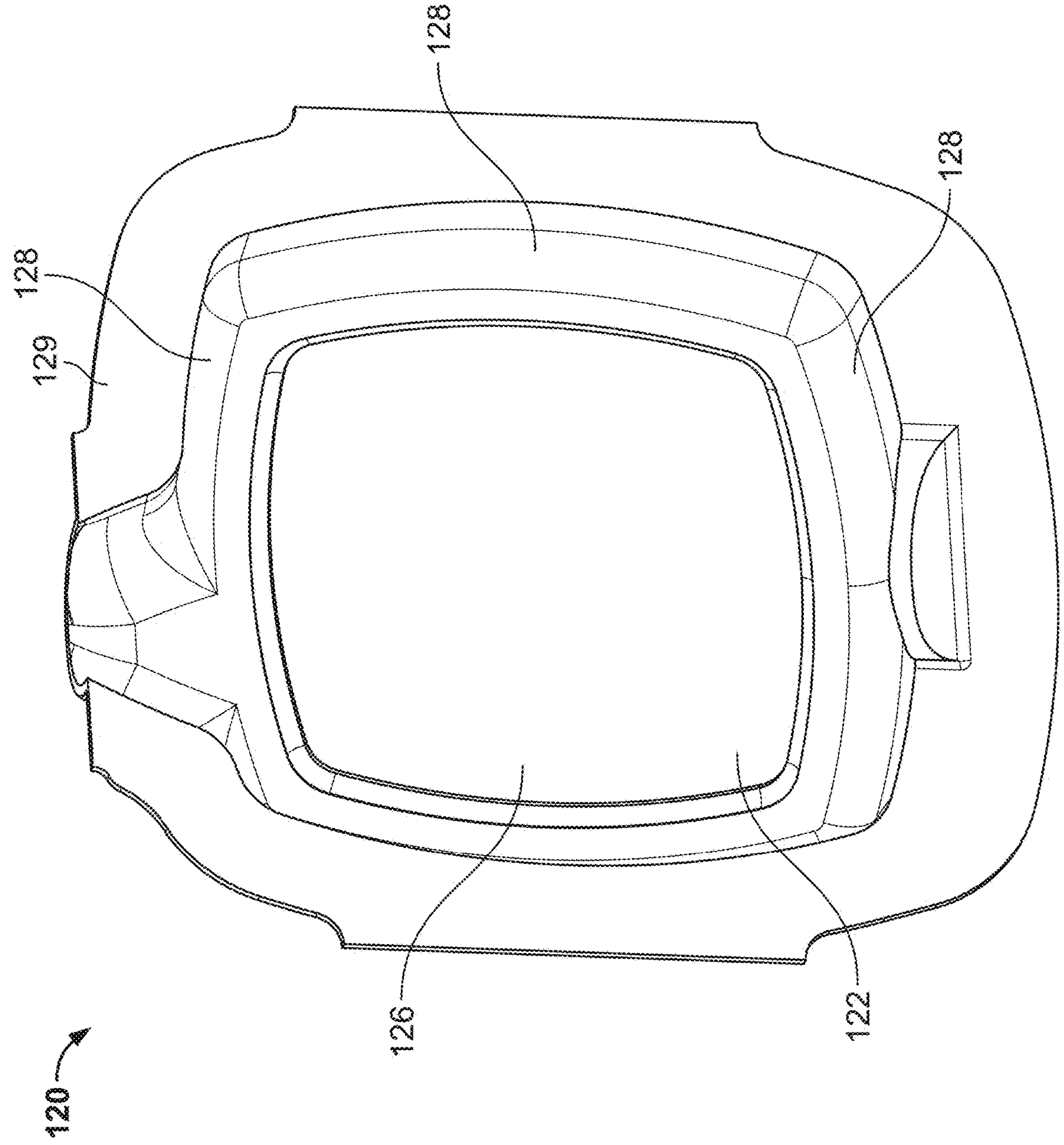
FIG. 7 is a perspective rear view of the cover.

The cover 120, as shown in FIGS. 6 and 7, has an inner side 122 and an outer side 124 opposite the inner side 122.

The cover 120 has a cover wall 126 and a plurality of cover sides 128 extending from the cover wall 126. At an end of each of the cover sides 128 opposite the cover wall 126, in the shown embodiment, the cover 120 has a cover flange 129.

The base 110 is attached to the cover 120 to form the container 100, as shown in FIG. 1. In the shown embodiment, the base flange 119 is connected to the cover flange 129. The container 100, between the base 110 and the cover 120, defines a bait containing space 132, shown in FIGS. 10 and 11, with the bait 190 contained in the bait containing space 132. The container 100 has a plurality of sides 130 defining the bait containing space 132. The sides 130 of the container 100, in the shown embodiment, are each formed from one of the base sides 118 of the base 110 and one of the cover sides 128 of the cover 120 connected together.

The container 100 is in a closed state C shown in FIG. 1 when the base 110 is initially attached to the cover 120. In the closed state C, the bait containing space 132 is completely enclosed to seal the bait 190 within the bait containing space 132.

In the closed state C, as shown in FIG. 1, the container 100 forms a tab 134 at one of the sides 130. The tab 134 is formed from part of the base 110 and part of the cover 120; the tab 134 is integrally formed with the container 100. The tab 134, in the closed state C, encloses an access opening 136 of the container 100, shown in FIGS. 2 and 3, to seal the bait containing space 132.

Figure 5:
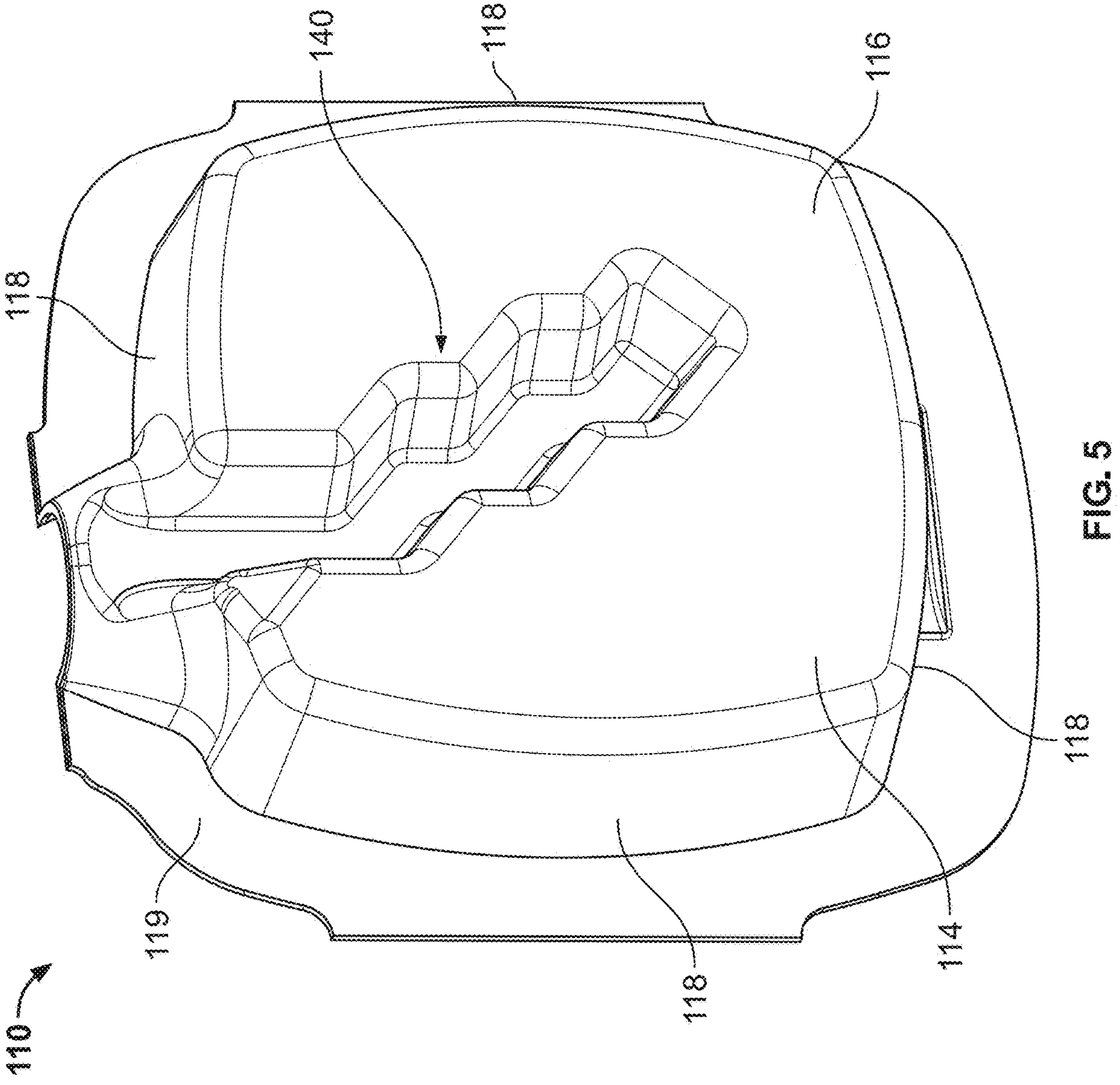
FIG. 5 is a perspective back view of the base.

The container 100, as shown in FIGS. 2-5, has an access structure 140 protruding from the container 100 into the bait containing space 132. The access structure 140 may be formed by deforming a portion of the base wall 116 of the base 110 into the bait containing space 132, as shown in FIG. 5, for example by thermal forming. Alternatively, the access structure 140 may be a separate component attached to the inner side 112 of the base 110 to extend into the bait containing space 132.

Figure 3:
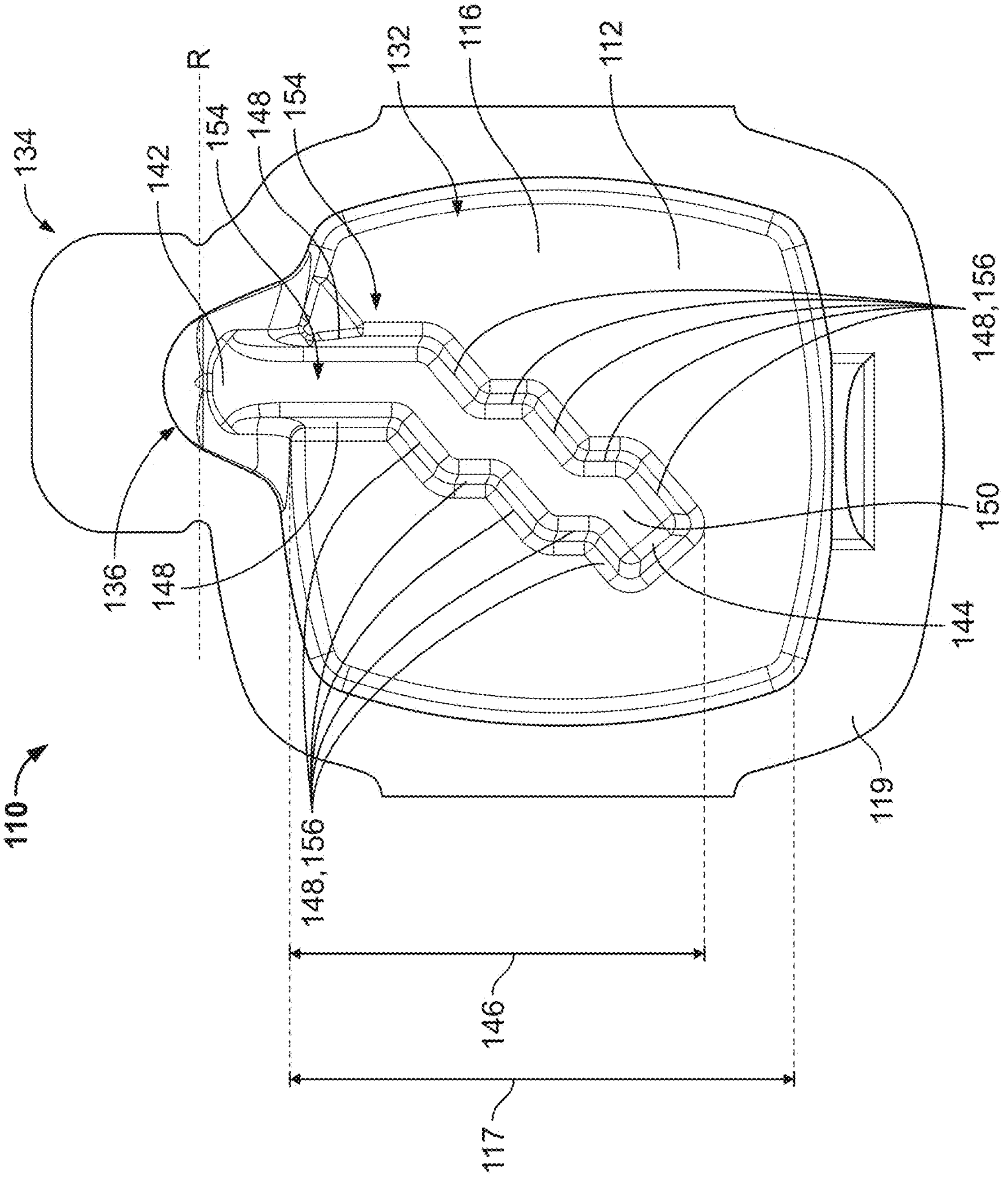
FIG. 3 is a front view of an inner side of the base.
Figure 4:
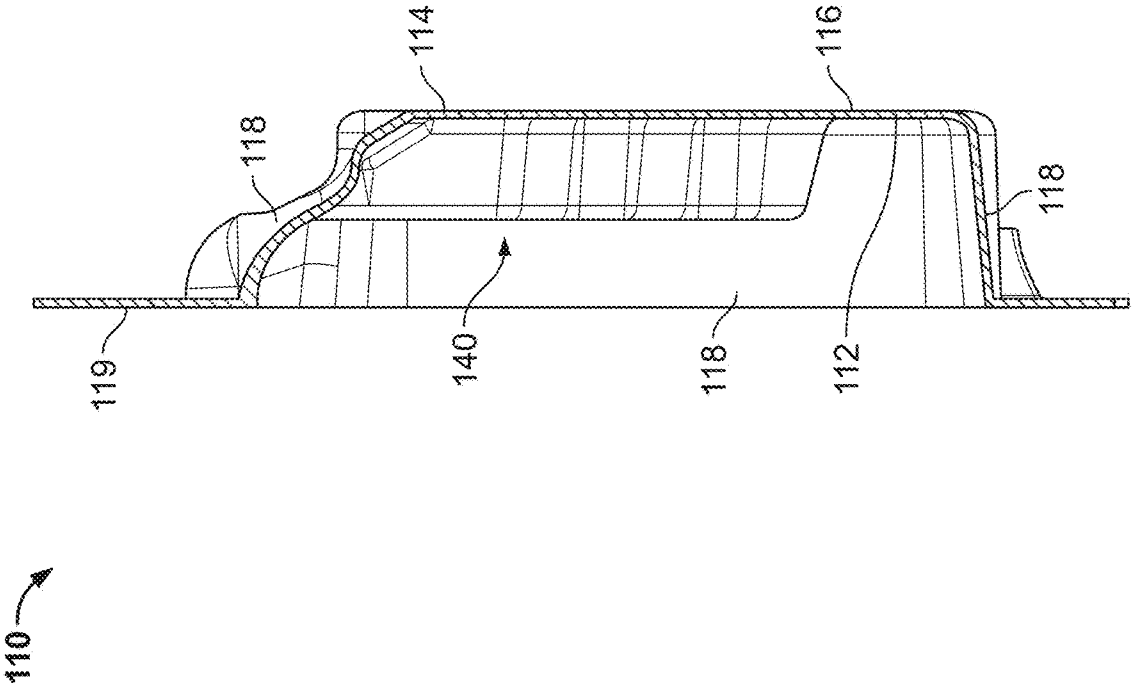
FIG. 4 is a sectional side view of the base, taken along line 4-4 in FIG. 2.

The access structure 140 extends from a first end 142 at the access opening 136 adjacent to the tab 134 to a second end 144 opposite the first end 142, as shown in FIGS. 2, 3, 10, and 11. As shown in FIG. 3, the access structure 140 has a length 146 to the second end 144 that extends over move than half of a length 117 of the base wall 116. The second end 144 is spaced apart from the base sides 118 of the base 110 and from the sides 130 of the assembled container 100.

As shown in FIGS. 2, 3, 10, and 11, the access structure 140 has a plurality of first surfaces 148 that extend from the base 110 and a second surface 150 that connects an end of the first surfaces 148 opposite the base 110. The second surface 150, in the shown embodiment, extends approximately perpendicular to the first surfaces 148. Throughout the specification, the term "approximately" means within 10% of the expressed value. In the embodiment shown in FIG. 10, the second surface 150 has a width 152 that is greater than half of a width 137 of the access opening 136.

Figure 10:
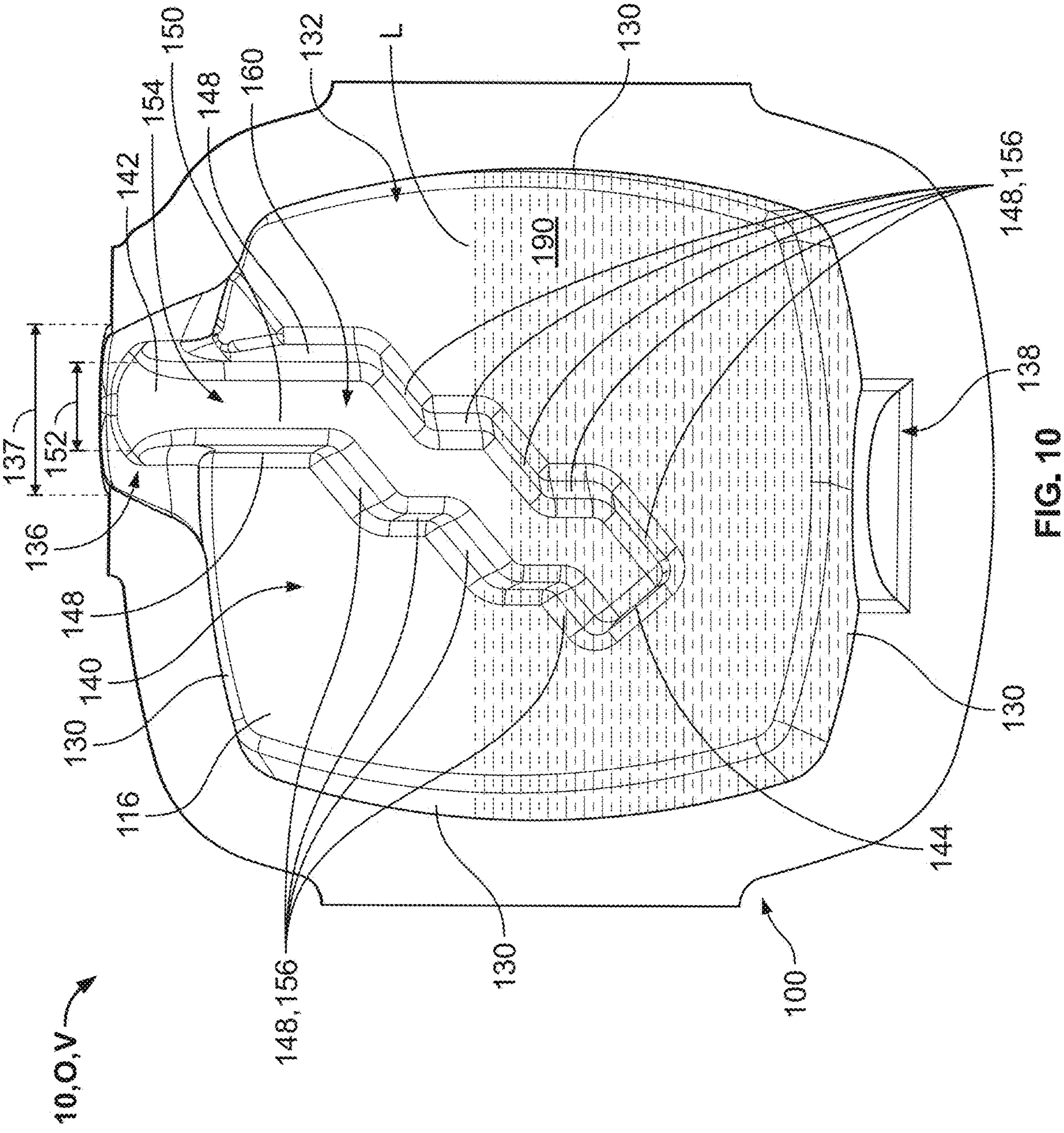
FIG. 10 is a front view of an interior of the bait packet with the tab removed.

The access structure 140, as shown in FIGS. 3 and 10, has a straight segment 154 extending from the first end 142 at the access opening 136 and a plurality of steps 156 extending from the straight segment 154 to the second end 144. The first surfaces 148 outside of the straight segment 154 are arranged in a stepped manner to form the plurality of steps 156. In the shown embodiment, the access structure 140 has three steps 156 extending from the straight segment 154 to the second end 144. In other embodiments, the access structure 140 may have greater than three or less than three steps 156 extending from the straight segment 154, and the straight segment 154 may or may not be present.

The container 100, including the base 110, the cover 120, and the tab 134 formed by the base 110 and the cover 120, may be molded and formed by a form-fill-seal machine. The container 100 may be molded in a single piece or the base 110 and the cover 120 may be formed separately and attached together to create the bait containing space 132. The container 100 may be formed from a plastic material, such as a laminated plastic film, high-density polyethylene (HDPE), polyethylene terephthalate (PET), or another other type of plastic that is usable for insect traps. The container 100 may alternatively be formed from any material that can be thermally formed to produce the features and functionality described herein.

In an embodiment, when the container 100 is formed, the bait 190 is filled in the bait containing space 132 from a filling section 138 of the container 100 opposite the tab 134. The filling section 138 is in one of the sides 130 of the container 100, as shown in FIG. 10. The filling section 138 is then closed and sealed to seal the bait 190 in the bait containing space 132.

The tab 134 is removable to change the bait packet 10 from the closed state C, shown in FIG. 1, to an open state O, shown in FIGS. 8-11. In the open state O, the access opening 136 is exposed and extends through the container 100 into the bait containing space 132. The tab 134 can be removed by breaking, such as by a user twisting the tab 134 to separate the tab 134 from the rest of the container 100 at a removable line R shown in FIG. 1. Alternatively, the tab 134 can be removed by cutting at the removable line R.

Figure 8:
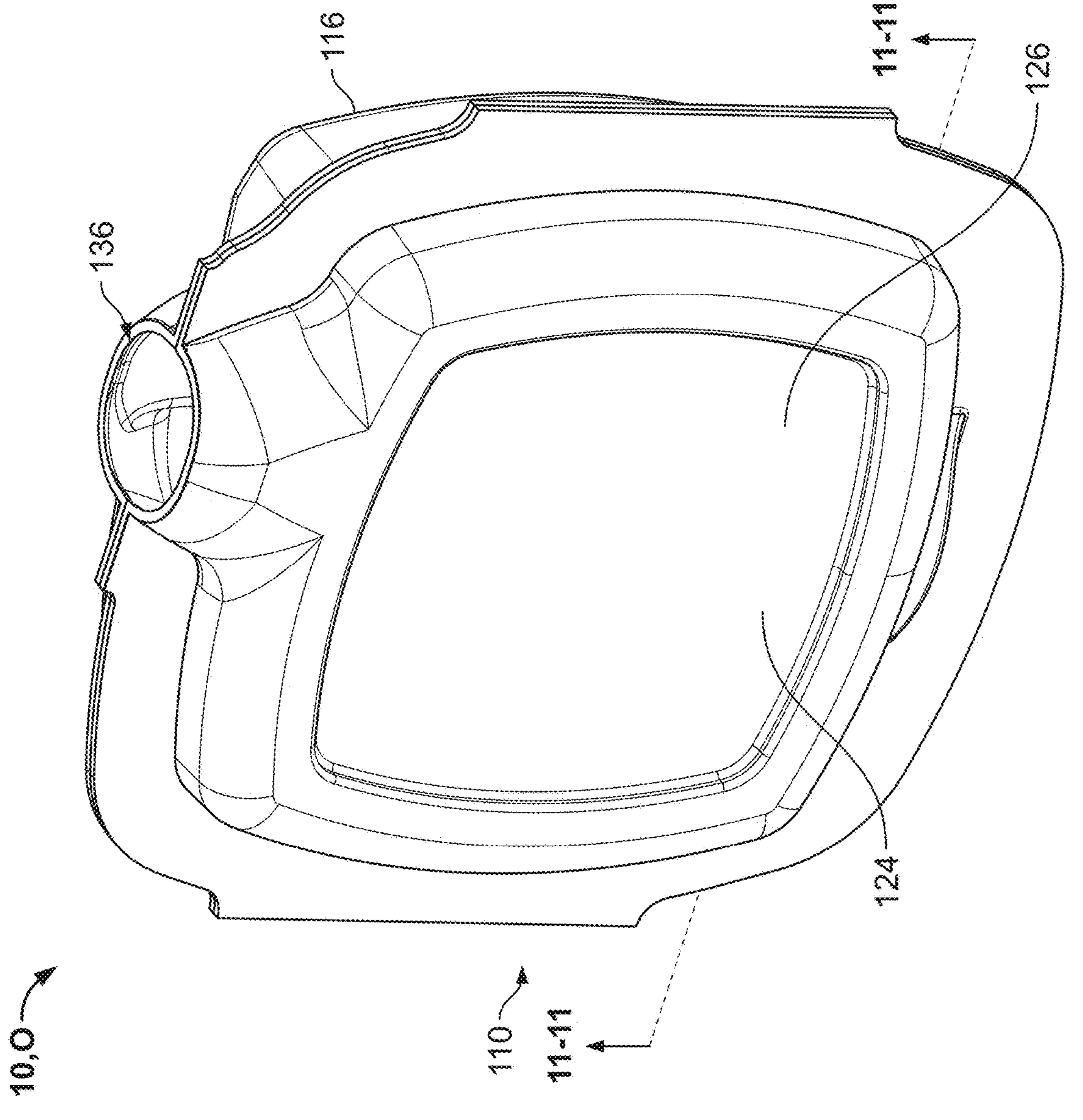
FIG. 8 is a perspective view of the bait packet with a tab removed to permit access to an interior of the bait packet.
Figure 9:
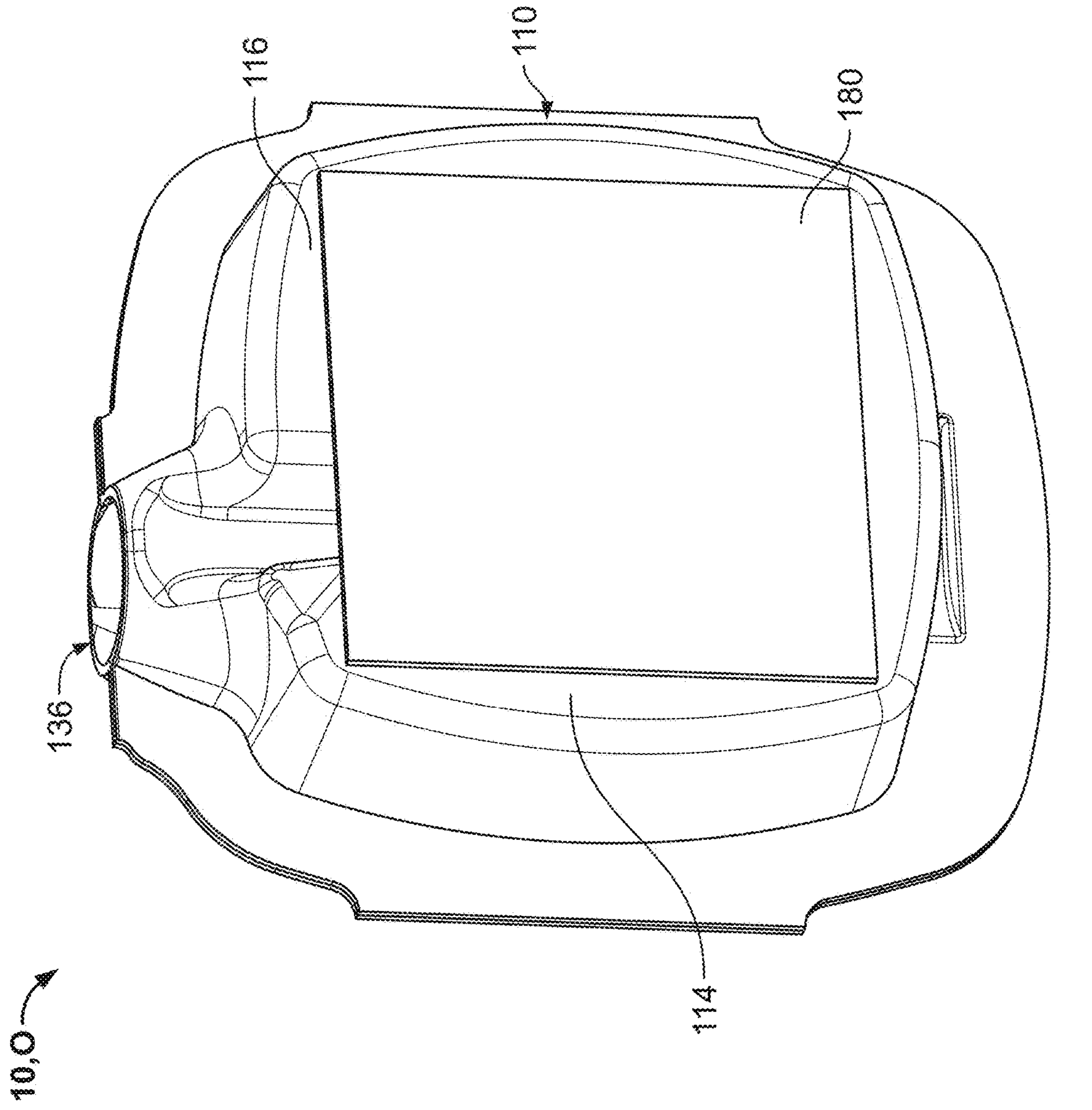
FIG. 9 is a rear perspective view of the bait packet showing an adhesive on the bait packet.

The bait packet 10 is shown in FIGS. 8 and 9 with the tab 134 removed. The bait packet 10 can then be positioned in either a first orientation V, shown in FIG. 10, or a second orientation H, shown in FIG. 11. The second orientation H is approximately perpendicular to the first orientation V.

As shown in FIG. 9, the bait packet 10 includes an adhesive 180 on the outer side 114 of the base 110. The adhesive 180 can be used to attach the bait packet 10 to a vertical surface to position the bait packet 10 in the first orientation V shown in FIG. 10, which is a vertical orientation of the bait packet 10. In an embodiment, the adhesive 180 is a double-sided adhesive.

A level L of the bait 190 in the first orientation V, or the vertical orientation, is shown with dashed lines in FIG. 10. The level L of the bait 190 in FIG. 10, and in FIG. 11 described in greater detail below, is merely exemplary and is intended to indicate an approximately maximum level of bait 190 in the bait packet 10. As insects, such as ants, consume the bait 190, the level L will decrease from the level schematically indicated in FIGS. 10 and 11.

As shown in the first, vertical orientation V of the bait packet 10 in FIG. 10, a first portion 160 of the access structure 140 is above the level L of the bait 190; the first portion 160 of the access structure 140 above the level L of the bait 190 includes a subset of the first surfaces 148 and a part of the second surface 150. Some of the first surfaces 148 are entirely above the level L of the bait 190 in the first orientation V.

In this first orientation V shown in FIG. 10, pests, such as insects and more specifically ants, can walk up a surface to which the bait packet 10 is mounted, such as a wall, and enter the bait containing space 132 through the access opening 136. The ants can stand on the first portion 160 of the access structure 140, on one of the first surfaces 148 that form steps 156 or part of the second surface 150, that is above the level L of the bait 190 to access and consume the bait 190. The ants can exit along the steps 156 of the first surfaces 148 or along the second surface 150 through the access opening 136 to return to their colony. As the bait 190 is consumed and the level L decreases in the first orientation V, the ants can travel further down the steps of the first surfaces 148 and stand on other exposed surfaces of the access structure 140 to reach the bait 190.

Figure 11:
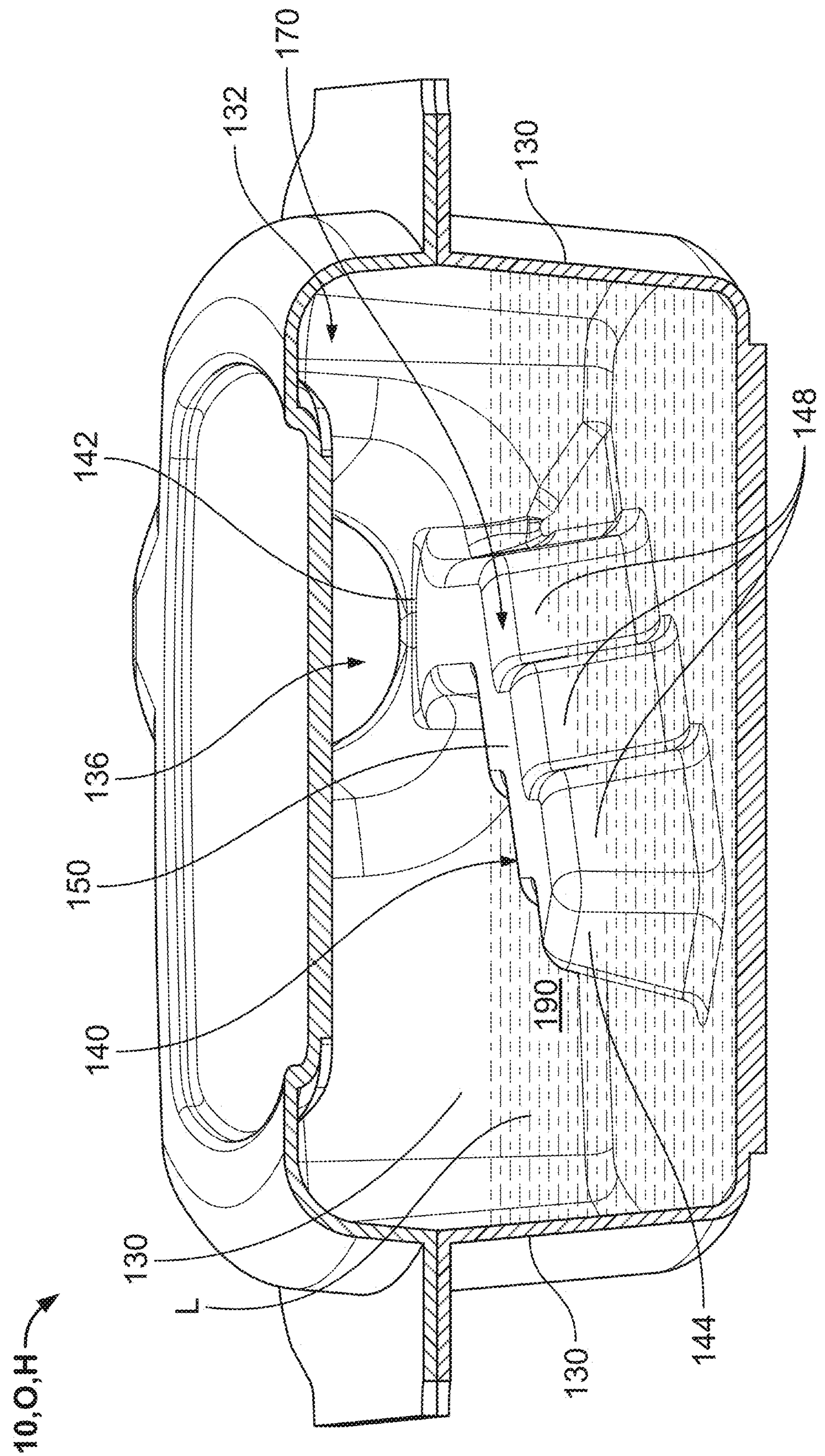
FIG. 11 is a sectional end view of the bait packet with the tab removed, taken along line 11-11 in FIG. 8.
Figure 12:
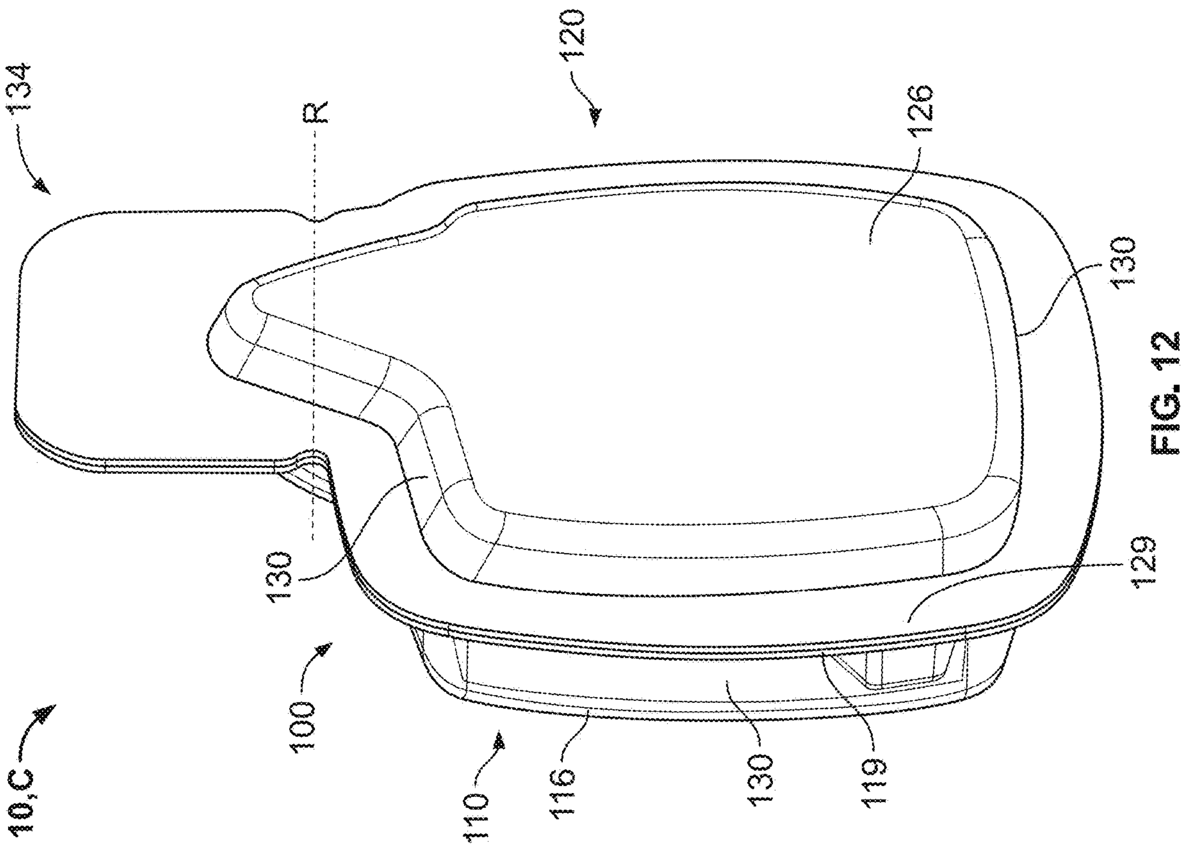
FIG. 12 is a front perspective view of a bait packet according to another embodiment.
Figure 13:
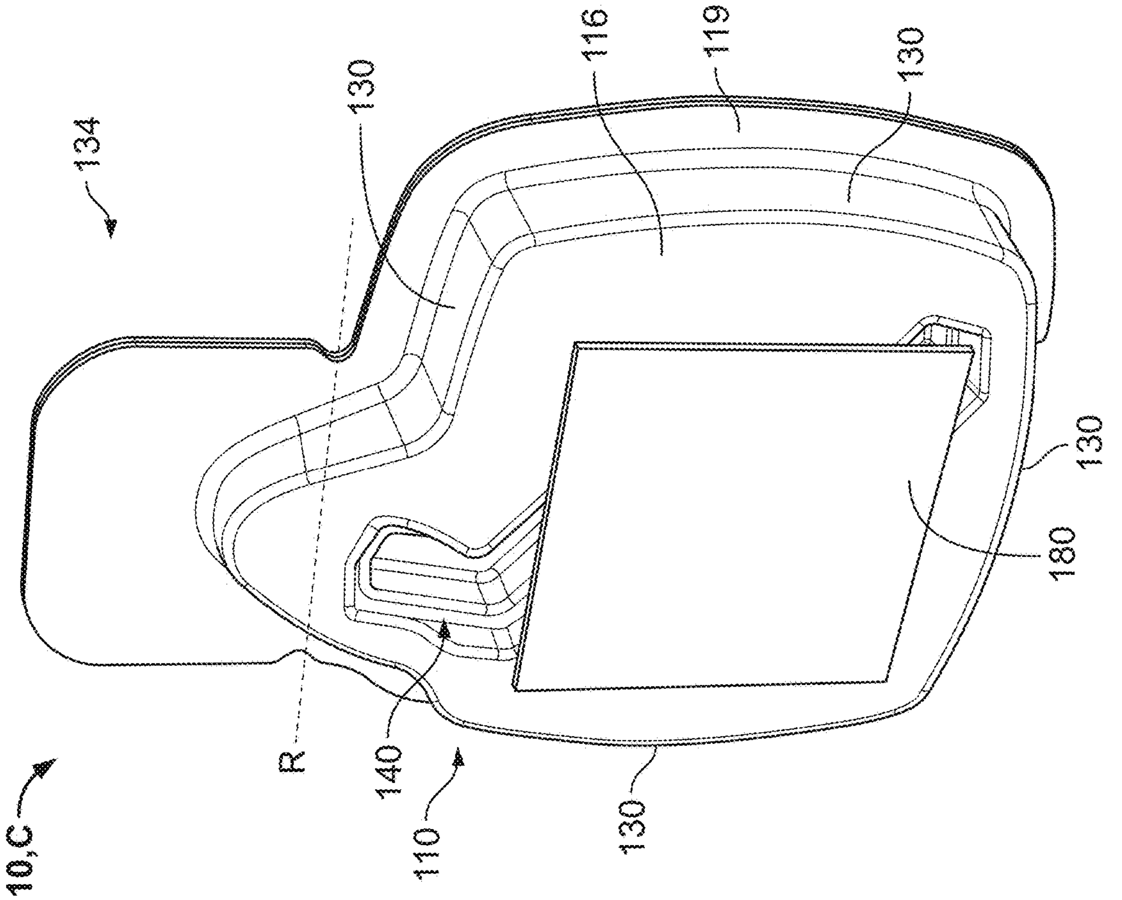
FIG. 13 is a rear perspective view of the bait packet of FIG. 12.

The bait packet 10 can also be positioned in the second orientation H shown in FIG. 11, which is a horizontal orientation. Like in FIG. 10, the dashed lines indicate the approximate maximum level L of bait 190 in the bait containing space 132.

In the second orientation H shown in FIG. 11, the ants can travel along a floor and enter the access opening 136. The ants can stand on a second portion 170 of the access structure 140 that is above the level L of the bait 190 in the second orientation H. The second portion 170 is different from the first portion 160 that extends above the level L of the bait 190 in the first orientation V. The second portion 170 includes the second surface 150 of the access structure 140, which is entirely above the level L of the bait 190 in the second orientation H, to access and consume the bait 190. A portion of each of the first surfaces 148 may also be above the level L of the bait 190 in the second orientation H. The ants can exit through the access opening 136 to return to their colony. As the bait 190 is consumed and the level L decreases in the second orientation H, the ants can travel further down the first surfaces 148 of the access structure 140 to reach the bait 190.

The bait packet 10 according to the embodiment shown in FIGS. 1-11 can thus be positioned in either of two orientations V, H, which are approximately perpendicular to one another, while still allowing ants to access the bait 190 in either orientation V, H. The access structure 140 has different surfaces 148, 150 that are above the level L of the bait 190 in either orientation V, H and provide a path for the ants to travel into and out of the bait containing space 132. The access structure 140 also provides ample surfaces 148, 150 for the ants to gather at the level L of the bait 190, avoiding bait 190 access chokepoints and more efficiently providing the bait 190 to the accessing ants. The bait packet 10 also contains the bait 190, without spilling, in both the first orientation V and the second orientation H.

A bait packet 10 according to another embodiment is shown in FIGS. 12-16. The bait packet has a similar structure and advantages as the bait packet 10 shown in FIGS. 1-11. Primarily the differences of the bait packet shown in FIGS. 12-16 will be described in detail; any features of the embodiment of FIGS. 12-16 not described are considered to be the same as those shown and described with respect to FIGS. 1-11. The features of the embodiment of FIGS. 12-16 can also be combined with those shown and described above with respect to FIGS. 1-11 to form other embodiments that are within the scope of the present invention.

As shown in the embodiment of FIGS. 12-16, the cover 120 is formed of an opaque plastic material and the base 110 is formed of a transparent or translucent plastic material. The opaque cover 120 largely prevents users from seeing unsightly ants inside the bait containing space 132 while the transparent base 110 permits users to monitor the level of the bait 190 in the bait containing space 132.

Figure 14:
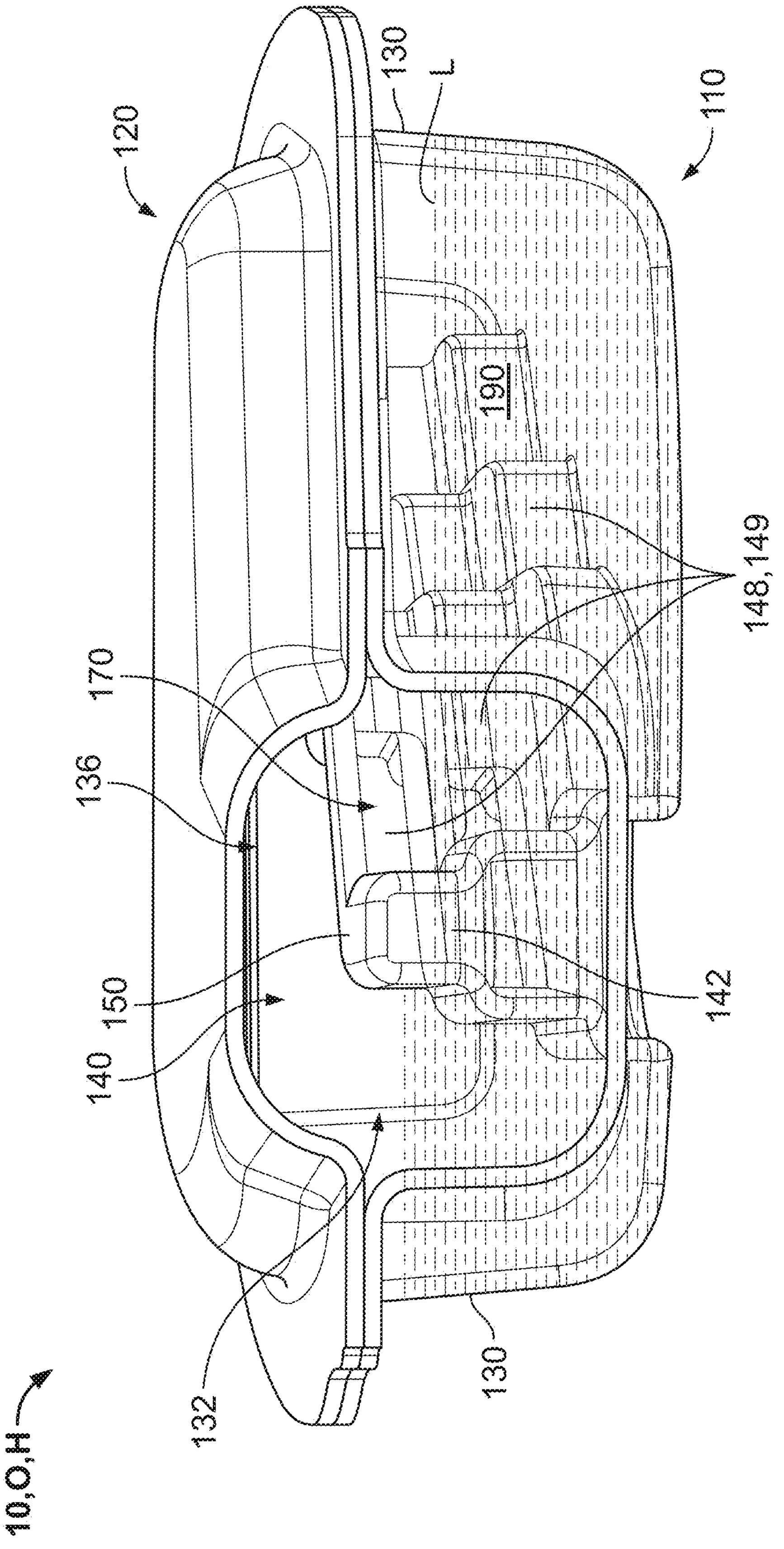
FIG. 14 is a front view of the bait packet of FIG. 12 with a tab removed.
Figure 15:
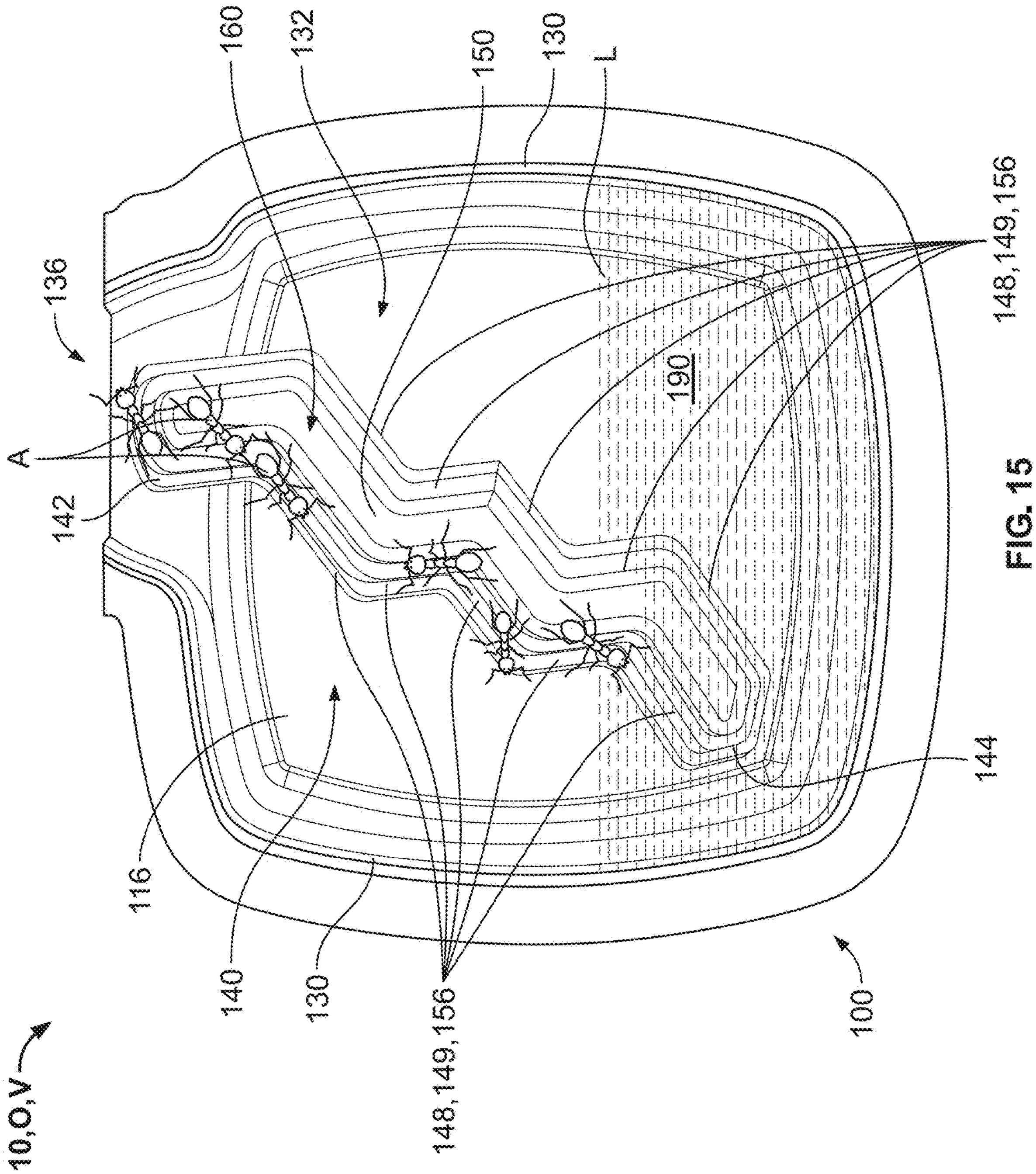
FIG. 15 is a front view of an interior of the bait packet of FIG. 12 in a first orientation with the tab removed.
Figure 16:
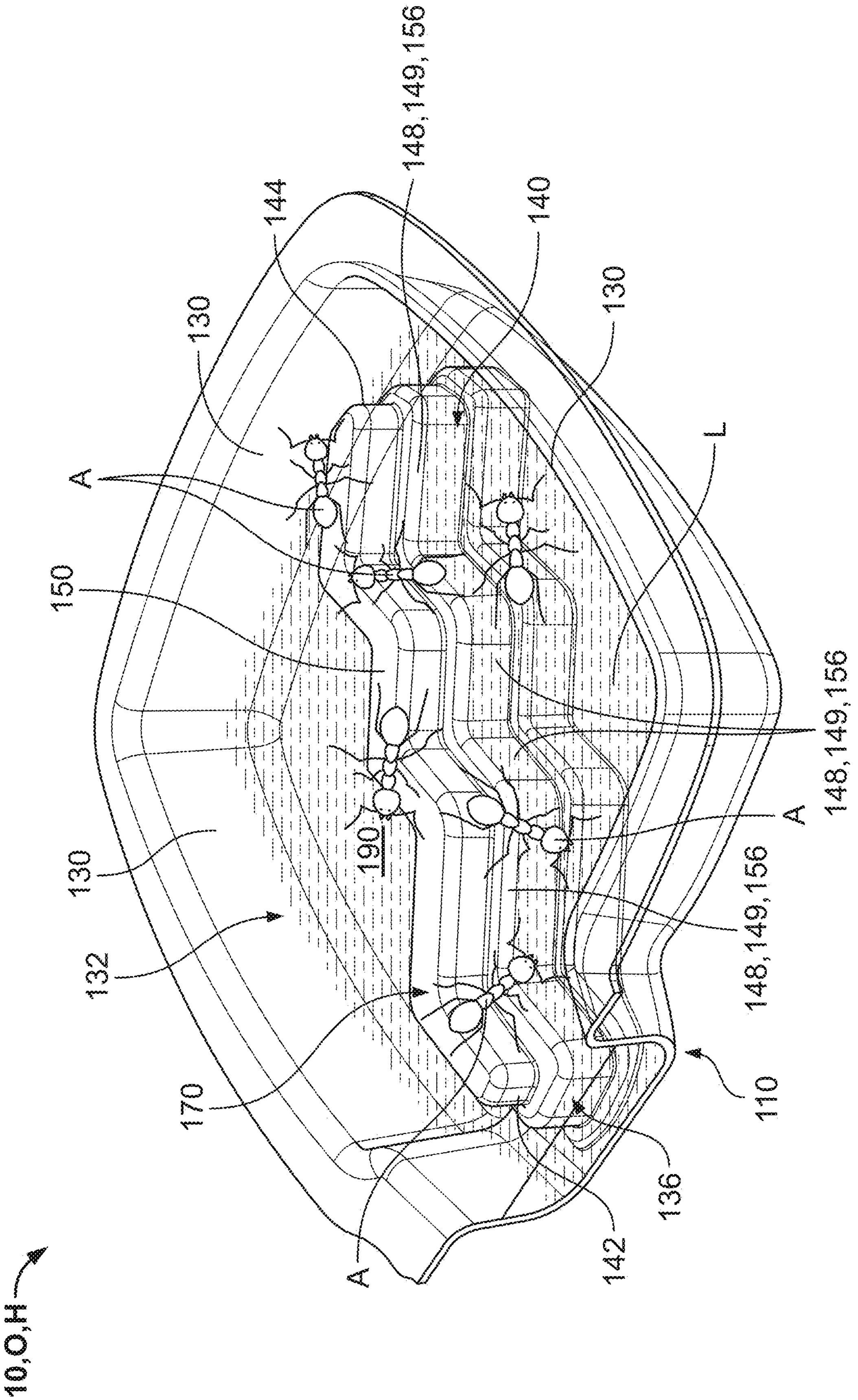
FIG. 16 is a perspective view of an interior of the bait packet of FIG. 12 in a second orientation with the tab removed.

As shown in FIGS. 14-16, the first surfaces 148 of the access structure 140 in this embodiment have multiple levels, creating a plurality of tiers 149 that extend up to the second surface 150. The tiers 149 provide additional small steps or surfaces for ants A to stand on.

FIG. 15 depicts the level L of the bait 190 in the first, vertical orientation V. As in the embodiment of FIGS. 1-11, a first portion 160 of the access structure 140 is above the level L of the bait 190 and the ants A can access the bait 190 from some of the tiered first surfaces 148 or part of the second surface 150. FIGS. 14 and 16 depict the level L of the bait in the second, horizontal orientation H. As in the embodiment of FIGS. 1-11, the second portion 170 of the access structure 140 is above the level L of the bait 190 in the second orientation H and the ants A can access the bait 190 from the entirety of the second surface 150 or a portion of the first surfaces 148.

A bait packet assembly 20 according to an embodiment is shown in FIGS. 17-22. The bait packet assembly 20 includes a bait packet 10', a housing 200, and a second bait 300.

Figure 17:
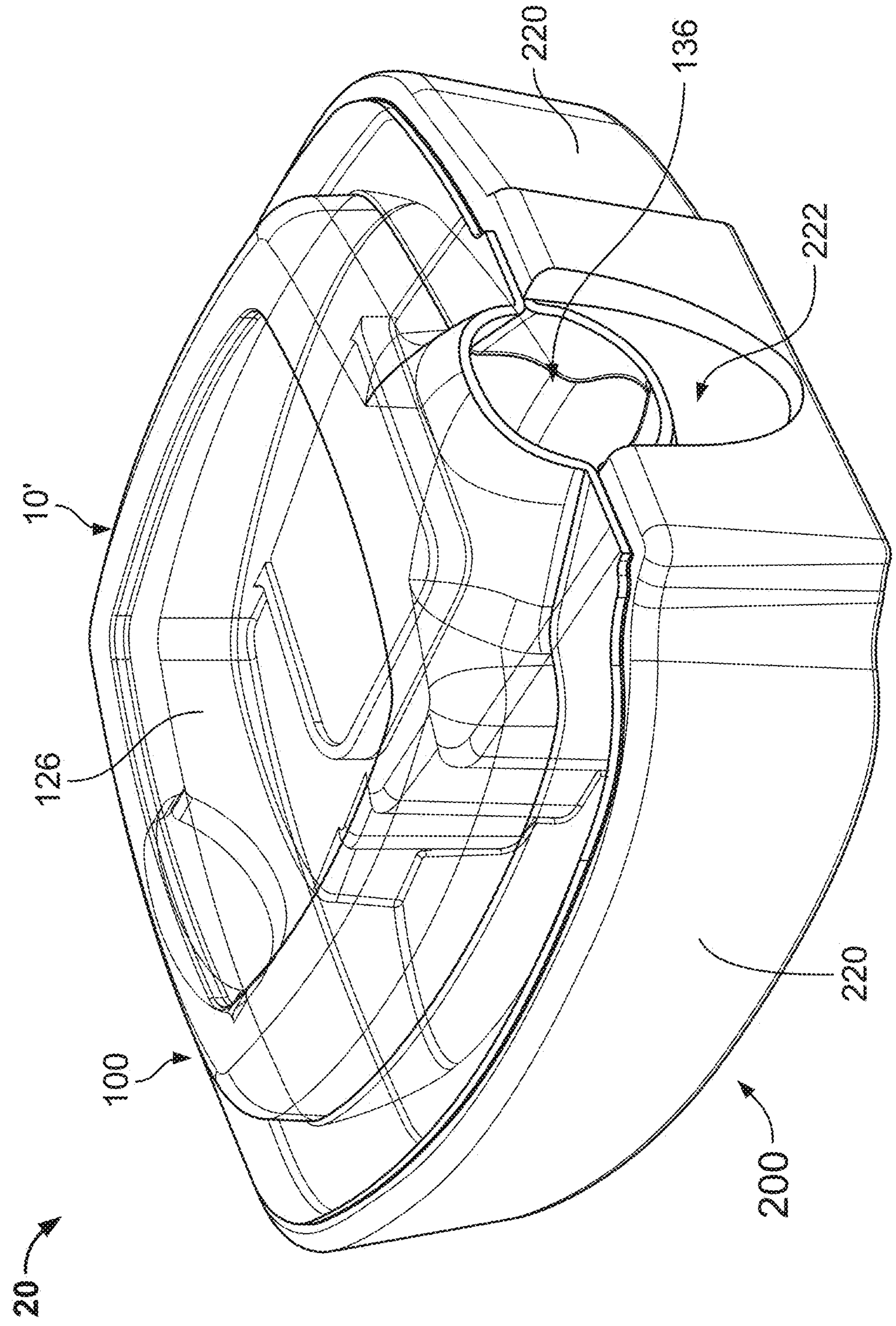
FIG. 17 is a perspective view of a bait packet assembly according to an embodiment.
Figure 18:
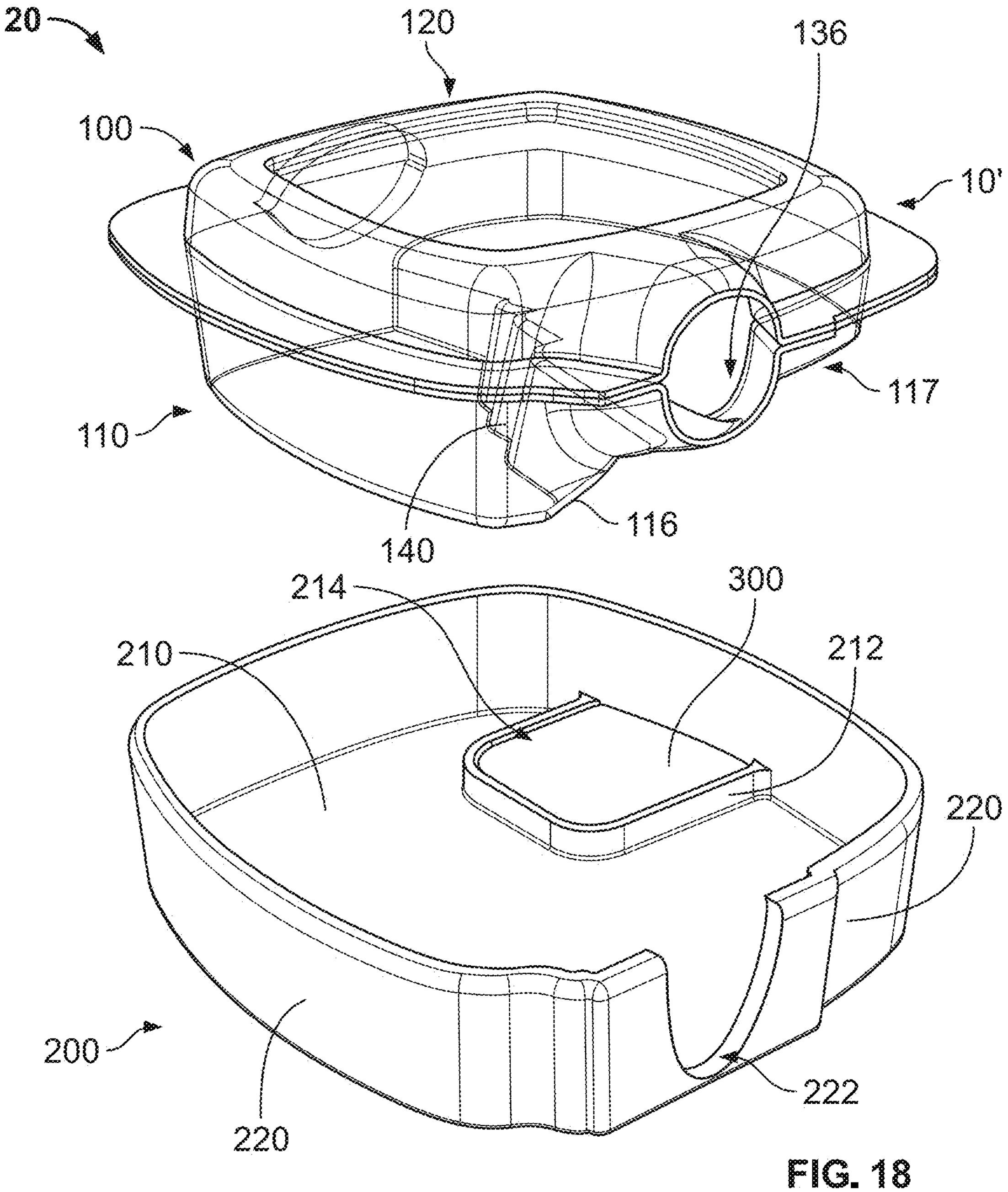
FIG. 18 is an exploded perspective view of the bait packet assembly of FIG. 17.
Figure 19:
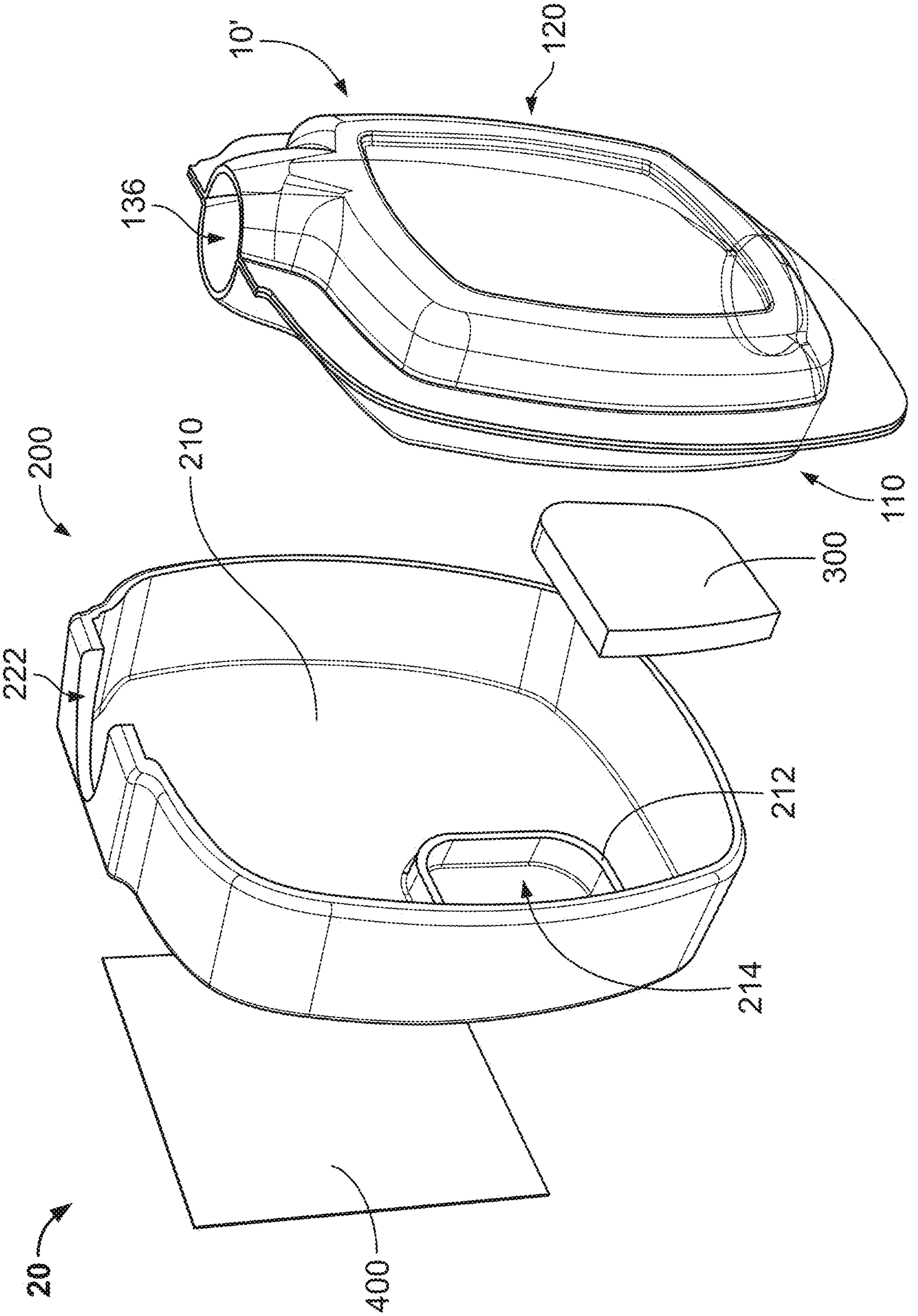
FIG. 19 is another exploded perspective view of the bait packet assembly of FIG. 17.
Figure 20:
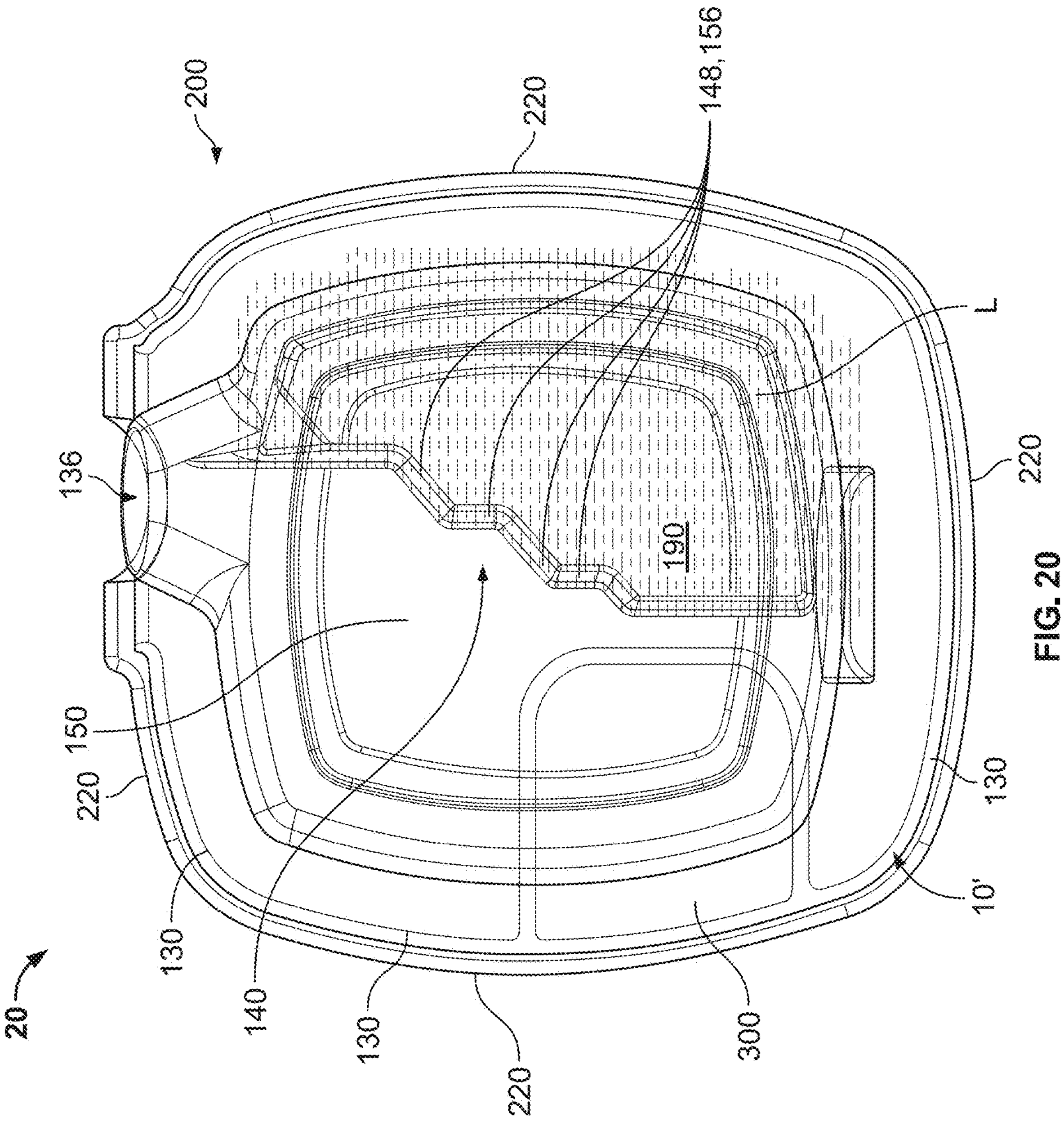
FIG. 20 is a front view of the bait packet assembly of FIG. 17 in a first orientation with a tab removed.
Figure 21:
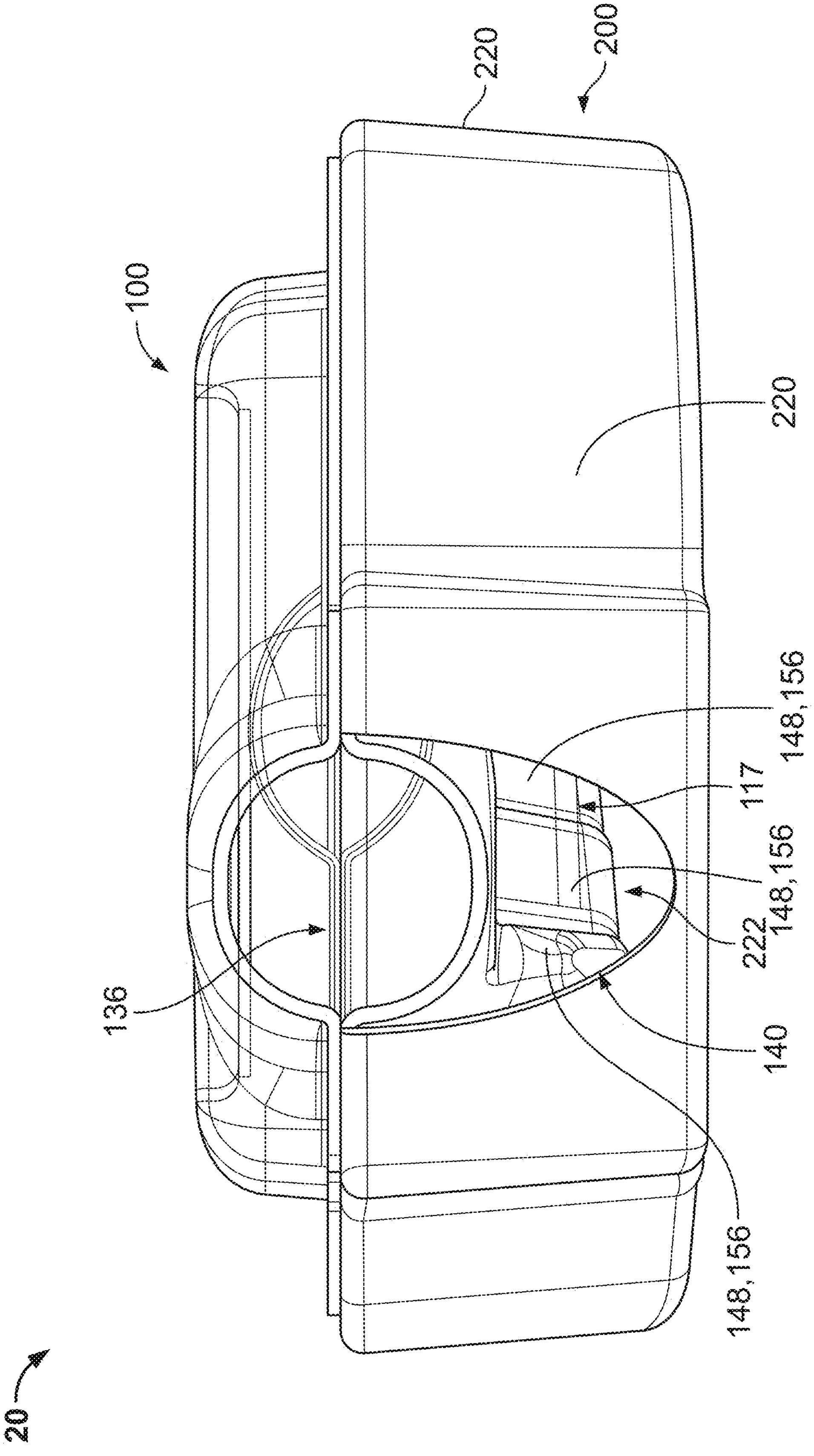
FIG. 21 is a front view of the bait packet assembly of FIG. 17 in a second orientation with the tab removed.

The bait packet 10' of FIGS. 17-22 is similar to the bait packets 10 described above with respect to FIGS. 1-16, except part of the base 110 is recessed in the bait packet 10' of FIGS. 17-22. As shown in FIGS. 18, 20, and 21, on one side of the access structure 140, the base 110 is recessed to the level of the second surface 150, creating an open space or bait recess 117 under the base wall 116 of the base 110 that forms the second surface 150. In this embodiment, the second surface 150 extends from the end of the first surfaces 148 to the sides 130 of the container 100. The bait packet 10' is otherwise the same as the embodiments described above with respect to FIGS. 1-16.

As shown in FIGS. 18 and 19, the housing 200 is a shell that has an inner surface 210 with an interior defined area 214 and a plurality of sidewalls 220. The inner surface 210 has a bottom perimeter structure 212 that extends from the inner surface 210 and defines the interior defined area 214. The second bait 300 is positioned in the interior defined area 214 on the inner surface 210 of the housing 200. In an embodiment, the second bait 300 is a solid, protein-based material different from the liquid or gel-like sugar-based material of the bait 190 described above with respect to FIGS. 1-16.

The bait packet 10' is positioned over the second bait 300 that is in the interior defined area 214 on the inner surface 210 of the housing 200, as shown in FIGS. 18-20. The bait recess 117 under the second surface 150 of the access structure 140 of the bait packet 10' accommodates the second bait 300 that is positioned in the interior defined area 214 of the housing 200. In an embodiment, the housing 200 can have latches that engage a flange of the bait packet 10' to secure the bait packet 10' in the housing 200 in the position shown in FIGS. 17, 20, and 21.

The bait packet assembly 20 has an adhesive 400 on an outer side of an inner surface 210 of the housing 200, as shown in FIG. 19. The bait packet assembly 20 can be positioned in a first, vertical orientation V or a second, horizontal orientation H. The bait level L in the bait packet 10' acts the same in both orientations as described above with respect to FIGS. 1-16, except the second surface 150 extends over a larger section of the base 110 due to the presence of the bait recess 117 in this embodiment, as indicated by the liquid level L in dashed lines in FIG. 20.

In the bait packet assembly 20 of FIGS. 17-21, the ants can access the second bait 300 by entering the housing 200 under the bait packet 10', through a housing access opening 222 shown in FIGS. 17 and 21. The second bait 300 is positioned under the second surface 150 of the access structure 140 and is between the housing 200 and the bait packet 10'. The ants can move along the housing 200 in the bait recess 117 created by the base 110 of the bait packet 10' between the housing access opening 222 and the second bait 300. The bait packet assembly 20 thus allows for the ants to access multiple types of bait 190, 300 in multiple orientations without spilling the bait 190, 300.

Figure 22:
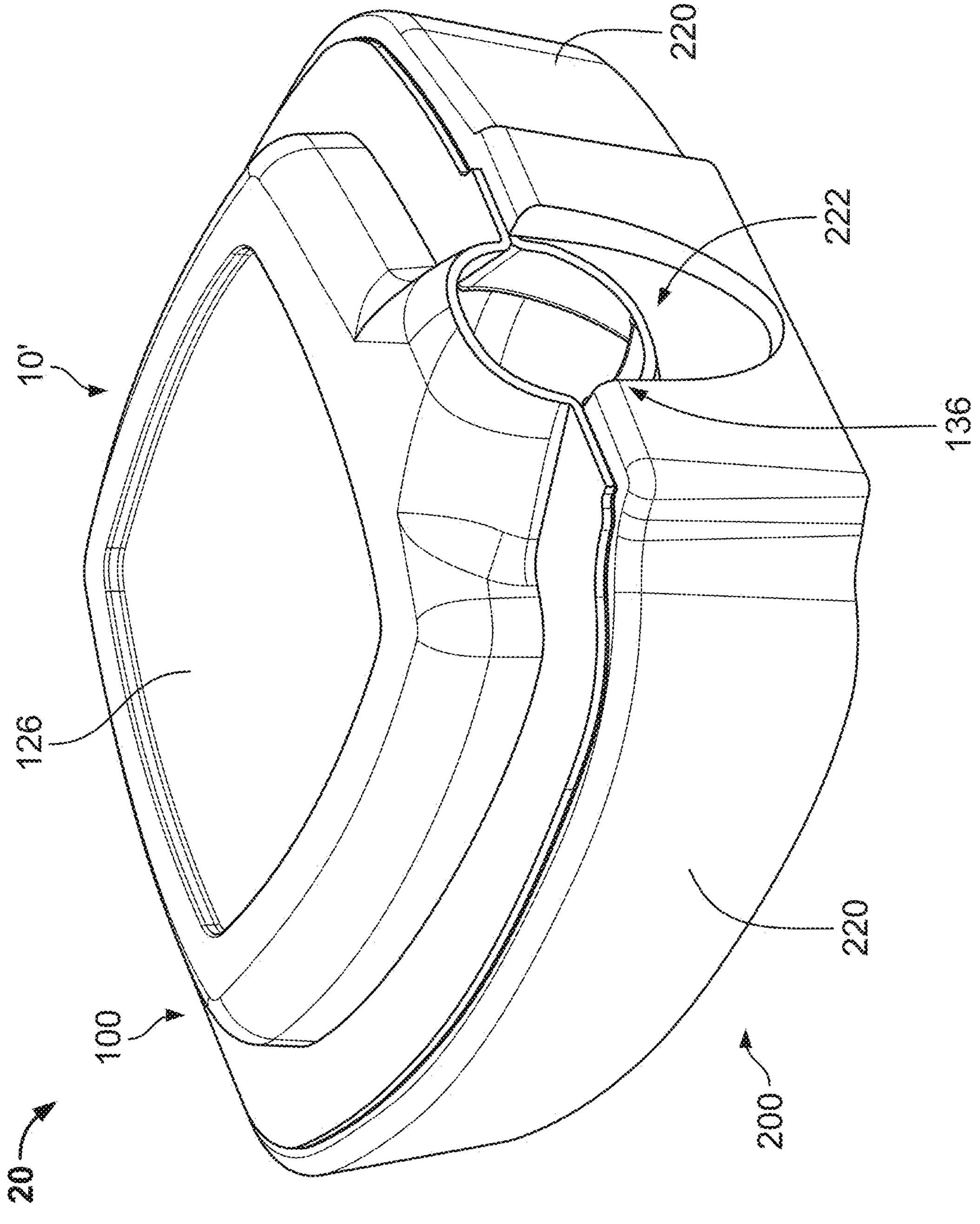
FIG. 22 is a perspective view of a bait packet assembly according to another embodiment.

FIG. 22 shows another embodiment of the bait packet assembly 20 in which the cover 120 of the bait packet 10' is opaque for a more aesthetically pleasing assembly. The function and features of the bait packet assembly 20 shown in FIG. 22 are otherwise the same as those described above with respect to FIGS. 17-21.

What is claimed is:

1. A bait packet, comprising:

a container defining a bait containing space with a bait in the bait containing space and an access opening extending through the container and into the bait containing space; and an access structure protruding from the container into the bait containing space, the access structure including:

a first portion that is above a level of the bait in a first orientation of the bait packet and a second portion different from the first portion that is above the level of the bait in a second orientation of the bait packet, the second orientation is approximately perpendicular to the first orientation;

a plurality of first surfaces extending from a base of the container and defining steps extending from above the level of the bait and into the bait containing space with the bait packet in the first orientation;

a second surface connecting an end of the first surfaces opposite the base and defining the second portion, the second surface extending from the ends of the first surfaces to sides of the container and to the access opening such that the access opening opens onto the second surface with the bait packet in the second orientation.

2. The bait packet of claim 1, wherein the access structure has a first end positioned at the access opening.

3. The bait packet of claim 2, wherein the access structure extends from the first end to a second end opposite the first end, the second end is spaced apart from a plurality of sides of the container.

4. The bait packet of claim 3, wherein the access structure has a straight segment extending from the first end and a plurality of steps extending from the straight segment to the second end.

5. The bait packet of claim 2, wherein the first portion of the access structure includes a subset of the first surfaces and a part of the second surface.

6. The bait packet of claim 2, wherein the second portion of the access structure includes an entirety of the second surface.

7. The bait packet of claim 2, wherein each of the first surfaces has a plurality of tiers.

8. The bait packet of claim 2, wherein the second surface has a width that is greater than half of a width of the access opening.

9. The bait packet of claim 1, wherein the container has a tab enclosing the access opening and sealing the bait containing space in a closed state of the bait packet.

10. The bait packet of claim 9, wherein the tab is integrally formed with the container and is removable by breaking or cutting to change the bait packet from the closed state into the open state.

11. The bait packet of claim 1, wherein the container includes a base and a cover attached to the base to form the bait containing space, the access structure extends from the base into the bait containing space.

12. The bait packet of claim 11, wherein the base is a translucent or transparent material.

13. The bait packet of claim 12, wherein the cover is an opaque material.

14. A bait packet assembly, comprising:

a housing;

a bait packet positioned in the housing, the bait packet including a container defining a bait containing space with a first bait in the bait containing space and an access structure protruding from the container into the bait containing space, the access structure has a first portion that is above a level of the bait in a first orientation of the bait packet and a second portion different from the first portion that is above the level of the bait in a second orientation of the bait packet, the second orientation is approximately perpendicular to the first orientation; and a second bait positioned between the housing and the bait packet.

15. The bait packet assembly of claim 14, wherein the housing has an inner surface with a bottom perimeter structure extending from the inner surface.

16. The bait packet assembly of claim 15, wherein the second bait is contained within the bottom perimeter structure.

17. The bait packet assembly of claim 16, wherein the access structure has a plurality of first surfaces extending from a base of the container and a second surface extending from an end of the first surfaces opposite the base.

18. The bait packet assembly of claim 17, wherein the second surface extends from the end of the first surfaces to a plurality of sides of the container, the second bait is positioned under the second surface of the access structure.

19. A bait packet assembly, comprising:

a housing defining an entry opening;

a bait packet positioned in the housing, the bait packet including a container defining a bait containing space adapted to receive a first bait, an access opening in communication with the entry opening of the housing, and an access structure protruding from the container into the bait containing space, the access structure having:

a first portion that is above a level of the bait in a first orientation of the bait packet; and a second portion different from the first portion that is above the level of the bait in a second orientation of the bait packet, the second orientation is approximately perpendicular to the first orientation; and a bait recess defined between an underside of the second portion of the bait packet and the housing and adapted to receive a second bait, the bait recess in communication with the entry opening of the housing.

20. The bait packet assembly of claim 19, wherein the housing has an inner surface with a bottom perimeter structure extending from the inner surface, the bottom perimeter structure arranged within the bait recess and adapted to receive and retain the second bait.

* * * * *